(12) United States Patent
Larsson

(10) Patent No.: US 12,117,118 B2
(45) Date of Patent: Oct. 15, 2024

(54) LIGHT HEAD FOR USE IN RELINING PIPES

(71) Applicant: Peanta Inventions AB, Sjobo (SE)

(72) Inventor: Peter Larsson, Sjobo (SE)

(73) Assignee: PEANTA INVENTIONS AB (SE)

( * ) Notice: Subject to any disclaimer, the term of this patent is extended or adjusted under 35 U.S.C. 154(b) by 389 days.

(21) Appl. No.: 17/609,210

(22) PCT Filed: May 8, 2020

(86) PCT No.: PCT/EP2020/062804
§ 371 (c)(1),
(2) Date: Nov. 5, 2021

(87) PCT Pub. No.: WO2020/225401
PCT Pub. Date: Nov. 12, 2020

(65) Prior Publication Data
US 2022/0205578 A1　Jun. 30, 2022

(30) Foreign Application Priority Data

May 8, 2019　(SE) .................................. 1950552-8

(51) Int. Cl.
*F16L 55/40*　(2006.01)
*F16L 55/18*　(2006.01)
(Continued)

(52) U.S. Cl.
CPC .............. *F16L 55/40* (2013.01); *F16L 55/18* (2013.01); *F21V 29/83* (2015.01);
(Continued)

(58) Field of Classification Search
CPC ........... F16L 55/40; F16L 55/18; F21V 29/83; F21V 33/0084
See application file for complete search history.

(56) References Cited

U.S. PATENT DOCUMENTS 10,337,659 B2 *　7/2019　Kuźniar .................. F16L 55/18
10,611,059 B2 *　4/2020　Kuźniar .............. B29C 35/0805
(Continued)

FOREIGN PATENT DOCUMENTS

CN　　1957198 A　　5/2007
CN　　101865372 A　　10/2010
(Continued)

OTHER PUBLICATIONS

Swedish Search Report issued on Oct. 30, 2019 for Swedish Patent Application No. 1950552-8 filed on May 8, 2019.
(Continued)

*Primary Examiner* — Bryon T Gyllstrom
(74) *Attorney, Agent, or Firm* — Fishman Stewart PLLC

(57) ABSTRACT

A light head for use in relining a pipe, the light head may include a proximal end cap, a distal end cap, at least one body, at least one LED-plate, and at least one spacer. The proximal end cap may include a fluid inlet. The body may be arranged between the proximal end cap and the distal end cap. The body may include a longitudinal passage extending from the proximal end cap to the center of the body. At least one lateral channel may extend from the longitudinal passage to an outlet. The LED-plate may include at least one light emitting diode. The spacer may be disposed between the LED-plate and the body. The longitudinal passage may be configured to receive fluid from the inlet such that the fluid hits the LED-plate.

14 Claims, 5 Drawing Sheets

(51) Int. Cl.
  *F16L 101/18* (2006.01)
  *F21V 29/83* (2015.01)
  *F21V 33/00* (2006.01)
  *F21W 131/411* (2006.01)
  *F21Y 115/10* (2016.01)

(52) U.S. Cl.
  CPC ....... *F21V 33/0084* (2013.01); *F16L 2101/18* (2013.01); *F21W 2131/411* (2013.01); *F21Y 2115/10* (2016.08)

(56) References Cited

U.S. PATENT DOCUMENTS

| | | | | |
|---|---|---|---|---|
| 10,808,875 | B2* | 10/2020 | Lindelof | F16L 55/18 |
| 11,118,716 | B2* | 9/2021 | Kanres | F16L 55/18 |
| 11,305,492 | B2* | 4/2022 | Elsom | B32B 37/06 |
| 2010/0051168 | A1* | 3/2010 | Moeskjaer | F16L 55/165 156/64 |
| 2017/0299106 | A1* | 10/2017 | Lindelof | F16L 55/162 |
| 2017/0361506 | A1* | 12/2017 | Smith | B29C 35/0805 |
| 2018/0015512 | A1* | 1/2018 | Lendi | H04N 23/57 |
| 2018/0162017 | A1* | 6/2018 | Kuzniar | B29C 35/0805 |
| 2018/0328531 | A1* | 11/2018 | Weisenberg | F16L 55/18 |
| 2020/0003354 | A1* | 1/2020 | Kanres | F16L 55/18 |

FOREIGN PATENT DOCUMENTS

| | | |
|---|---|---|
| CN | 109690163 A | 4/2019 |
| EP | 2129956 A1 | 12/2009 |
| EP | 3346175 A1 | 7/2018 |
| SE | 540893 C2 | 12/2018 |
| WO | 2018127583 A1 | 7/2018 |
| WO | 2018160974 A1 | 9/2018 |

OTHER PUBLICATIONS

Chinese Search Report dated Feb. 13, 2023 for copending Chinese App. No. 20208003417.7, English translation only.
Machine English translation CN1957198.

* cited by examiner

LIGHT HEAD FOR USE IN RELINING PIPES

CROSS-REFERENCE TO RELATED APPLICATIONS

This application is a National Phase application claiming benefit of International Application No. PCT/EP2020/062804 filed on May 8, 2020, which claims priority to Swedish Patent Application No. 1950552-8, filed on May 8, 2019, the complete disclosures of which are hereby incorporated in by reference in their entireties.

FIELD OF THE INVENTION

This invention pertains in general to the field of relining pipes such as kitchen and sewer pipes. More particularly, the invention pertains to a light head for use in relining pipes.

BACKGROUND OF THE INVENTION

Pipelines and piping systems present in sewers and households tend to wear out with time leading to leakage of the fluids flowing therethrough and contamination of the surrounding environment.

Replacement of the pipes may be difficult and expensive in particular where it is necessary to dig up the ground around the pipe such as a sewer pipe or when scaffolding must be erected to facilitate access to a vertical downpipe on a multi-story dwelling. An alternative to replacing pipes is to reline the pipe by inserting a liner through the pipe interior before curing a resin in the liner to facilitate adhesion of the liner to the pipe's interior surface thereby sealing the leaks.

EP 2 129 956 B1 discloses an apparatus and method for curing a liner of a pipeline. On the apparatus's outer wall is a plurality of light emitting diodes (LEDs) for irradiating the liner to cure the resin in the liner as the apparatus moves through the pipe. The inner wall of the apparatus defines a substantially unobstructed through-going passage extending longitudinally between opposite first and second ends. In use the liner is inflated by a supply of pressurized air that enters one end of, and passes through, the apparatus before the air is expelled through the opposing end of the apparatus. The expelled air inflates the liner before being returned to the atmosphere externally of the apparatus. As the pressurized air passes through the apparatus interior it also cools metallic elements that accept heat from the outer LEDs. However, the apparatus of EP 2 129 956 B1 has several light heads connected in series to form an elongated structure that tends to become stuck in a pipe during use. Such elongated structure is also not suitable for use in bent pipes or pipes with right angles. Moreover, the apparatus tends to overheat due to inefficient heat transfer from the outer LEDs to the interior metallic elements where the pressurized air passes through.

It would be desirable to provide an improved light head for use in relining a pipe that addresses the drawbacks and limitations of the prior art.

SUMMARY OF THE INVENTION

Accordingly, the present invention preferably seeks to mitigate, alleviate or eliminate one or more of the above-identified deficiencies in the art and disadvantages singly or in any combination and solves at least the above mentioned problems by providing a light head for use in relining a pipe comprising a proximal end cap with an fluid inlet, a distal end cap, at least one body arranged between the proximal end cap and the distal end cap, wherein the body has a longitudinal passage extending from the proximal end cap to the centre of the body, and wherein at least one lateral channel is extending laterally from the longitudinal passage to an outlet on a lateral outer side of the body, at least one LED-plate having a first surface and a second surface, wherein the first surface comprises at least one light emitting diode in order to emit light from the light head towards the pipe, and wherein the LED-plate is arranged on the lateral outer side of the body over the outlet, at least one spacer between the LED-plate and the body in order to create a gap between the plate and the body, and wherein the longitudinal passage is configured to receive fluid from the fluid inlet such that in use fluid from the fluid inlet passes through the at least one lateral channel of the body such that the fluid hits the second surface of the LED-plate, and exits through the gap caused by the at least one spacer.

In prior art system it is the body that is cooled down in order to subsequently cool the LED-plate and the LEDs arranged thereon. This requires a body having a high thermal conductivity. The preferred material of the body in prior art system is thus metal, which although have good thermal qualities have drawbacks relating to the manufacturing process. Metal is difficult to handle and process, and makes it hard to do small pieces and monolithic structures. Having a metal body thus increases the costs of the product.

The inventive design of creating a gap between the LED-plate and the body provides several benefits. Due to the direct fluid flow in the LED-plate, the LEDs are cooled directly the thermal conductivity of the body is no longer as relevant. This idea thus allows the body to be of a different material, preferably being a plastic material. Plastic is easier to process, and it is thus possible to create smaller structures as well as integrating different features such as cable channels into the body. Moreover, it makes it possible to construct the bodies as monolithic structures, which increases the durability and decreases the manufacturing costs.

The light head is also unique from prior art in that the body is arranged with at least one lateral channel having an outlet that is centrally located below the LED-plate. In the embodiment where the body is in the form of a triangular prism, each rectangular side of the body is arranged with an outlet that is centered on the rectangular side. In this way, the outlet of the lateral channel will be just below the LED-plate, thus providing cool air to the LEDs located above the outlet.

Further advantageous embodiments are disclosed below and in the appended patent claims.

BRIEF DESCRIPTION OF THE DRAWINGS

These and other aspects, features and advantages of which the invention is capable will be apparent and elucidated from the following description of embodiments of the present invention, reference being made to the accompanying drawings, in which.

DESCRIPTION OF EMBODIMENTS

The following description focuses on four embodiments of the present invention applicable to a light head for use in relining a pipe. However, it will be appreciated that the invention is not limited to these embodiments or application.

As the exemplary light head 100 is for use in longitudinal pipes, certain features of the light head is described with reference to proximal and distal ends which correspond with those of the longitudinal/length direction of a pipe. Other features of the light head is described using terms such as radial, radially, and radial direction which are intended to imply any direction starting at, or near, the central longitudinal axis of the pipe and moving outwards towards the surface of the pipe (or vice versa i.e. from outwards to at, or near, the inner central longitudinal axis). For example, a radial direction includes the radius of a circular pipe.

The light head 100 is small enough for use in kitchen pipes with a diameter of 70 mm, as well as bent pipes, and pipes with narrow angles and right angles. Suitable larger pipes may have diameters of up to 250-300 mm.

In use a liner is inserted into the interior of a pipe that is to be relined. A light head 100 is then pushed distally all the way through the liner/pipe and the LEDs 140 are illuminated. The light head is then dragged proximally back through the liner towards the user. Light from the LEDs cure the resin in the liner so the liner adheres to the interior of the pipe to seal the leaks.

Figure 1:
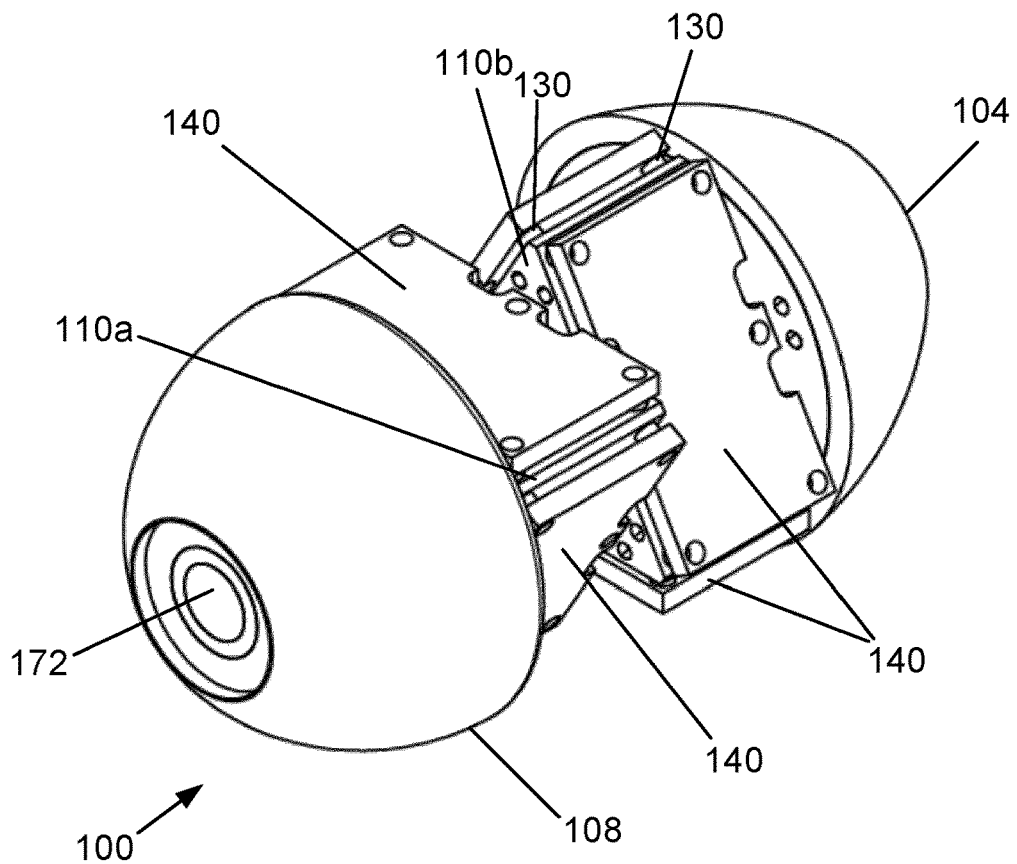
FIG. 1 is an isometric view of a light head according to one embodiment.
Figure 2:
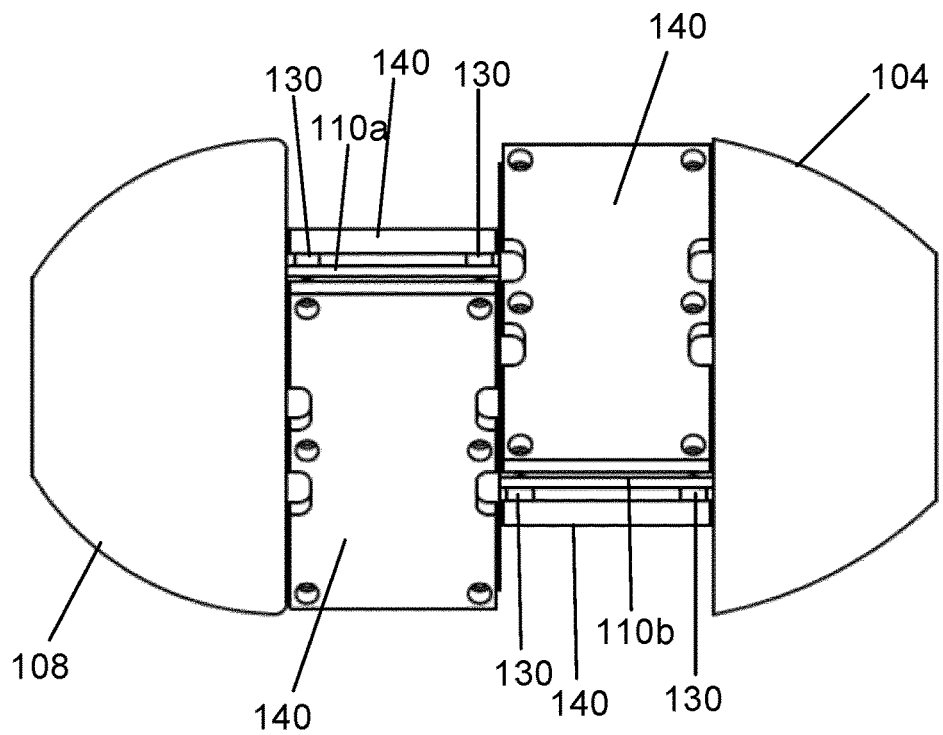
FIG. 2 is a side view of a light head according to one embodiment.
Figure 3:
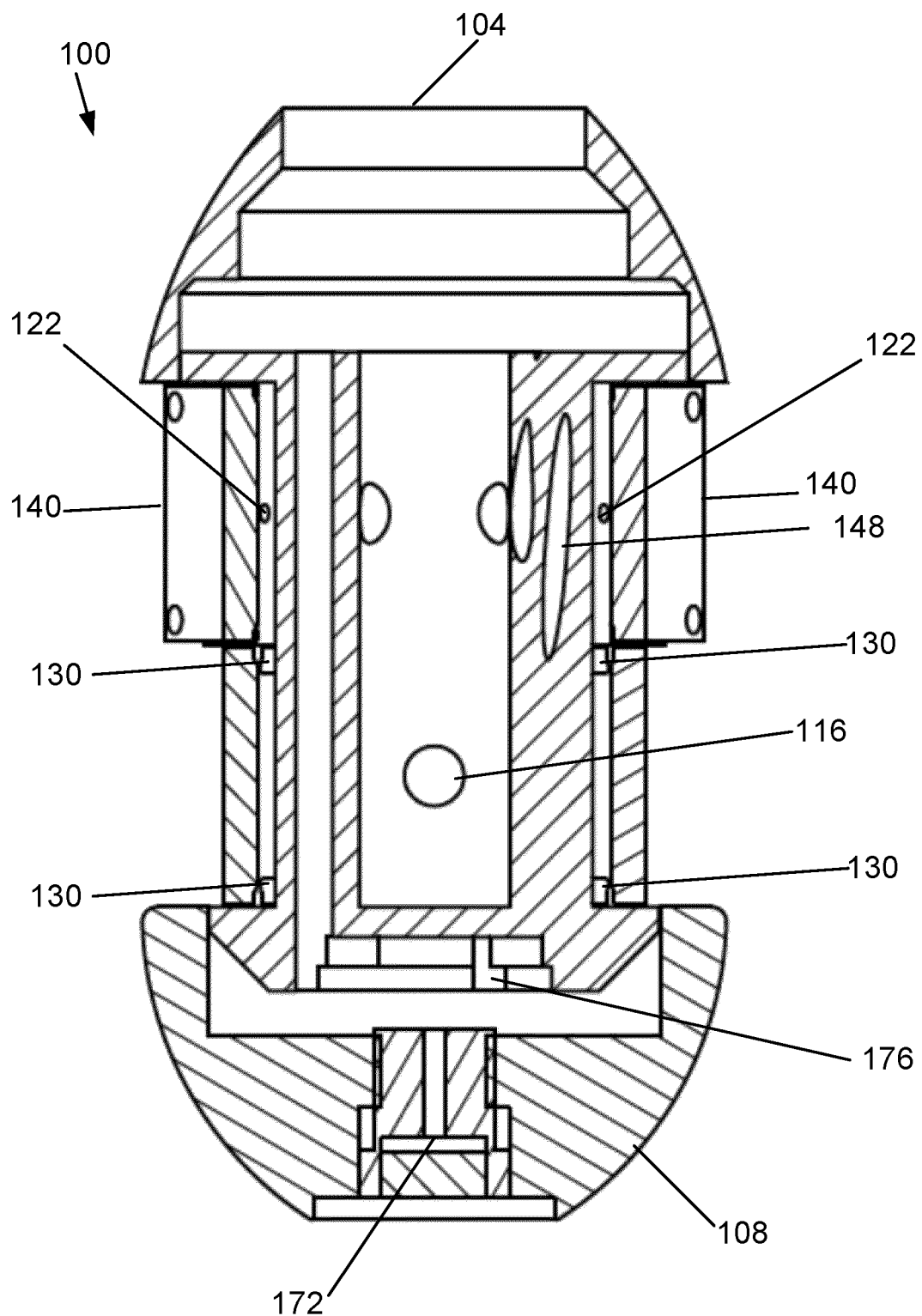
FIG. 3 is a front cross sectional view of a light head according to one embodiment.

FIGS. 1 to 4 illustrates a light head 100 or parts of a light head according to one embodiment. The light head 100 has a proximal end cap 104 and a distal end cap 108. The distal cap 108 is arranged opposite the proximal end cap 104. In one embodiment, as shown in FIGS. 1-3, the proximal end cap 108 has a conical shape. In other embodiments, the proximal end cap 108 may have a frusto-conical shape which has the advantage that the risk of getting stuck in a curve, say 90 degree curve, is reduced due to the shape.

The distal cap 108 has a central opening for receiving a camera 172 in a distal portion of the cap 108. This camera allows for inspection and monitoring of the liner (not shown) when in use. The camera 172 may have a wide angle lens. Preferably, a camera chip 176 is located proximal to the camera 172. The camera chip may for example be a 700 TVL camera chip.

In one embodiment, the camera chip 172 is arranged on a recess of a ring 168. The ring 168 may be located inside a proximal portion of the cap 108, and may be fasten to the cap 108 for example using screws.

Preferably, the distal end cap 108 is removable. Hence, when the light head 100 is not in use the distal end cap 108 is removable to allow for changing the camera 172 and other parts of the light head 100.

In one embodiment, the outer diameter of the proximal end cap 104 is 56 mm and the length of the light head 100 is around 85-90 mm. These are exemplary dimensions and may be increased or decreased depending on the size of the pipe to be relined.

The proximal end cap 104 is arranged with a fluid inlet 180. The fluid used in the light head is preferably air, although other fluids also may be used. As will be described more in detail later, in use pressurized air enters the air inlet 180 of the proximal end cap 104 and passes through the body 110a, 110b.

The light head 100 may further comprise a hose (not shown) connected to the air inlet 180 for supplying pressurized air to the longitudinal passage 116. A vortex cooler (not shown) may also be located proximally of the air inlet 180 for supplying pre-cooled air of about 5 to 6° C. to the light head 100.

It has been surprisingly found that the proximal entrance of air into the longitudinal passage 116 with subsequent passage and exit of the air from the body 110a, 110b in a generally radial direction through one or more channels 120 provides a superior cooling effect thereby avoiding overheating of the LEDs on the body's periphery. It is preferred that the air entering the air inlet 180 and passing through the longitudinal passage 116 does not continue distally so as to exit the light head 100 distally of the distal end cap 108.

The light head 100 has at least one body 110a, 110b arranged between the proximal end cap 104 and the distal end cap 108. In a preferred embodiment, the light head 100 has two bodies 110a, 110b both being arranged between the proximal end cap 104 and the distal end cap 108. The two bodies 110a, 110b are arranged adjacent to each other. As seen in FIG. 1, the two bodies 110a, 110b are positioned with an angle from each other.

The plurality of bodies 110a, 110b may be connected in different ways. In one embodiment, the bodies 110a, 110b have at least one body securing hole (not shown) extending between the proximal end cap 104 and the distal end cap 108 configured for receiving a longitudinal screw. However, it should be understood that other possibilities of attachment lies within the scope of the invention.

The bodies 110a, 110b are preferably in a three dimensional shape. More preferably, the shape is a triangular prism, hence the bodies preferably have a triangular prismatic symmetry. The material of the two bodies 110a, 110b is preferably a plastic material. The plastic material has sufficient isolating properties while still being a material that is easy to manipulate during the manufacturing process. Plastic is easier to process, and it is thus possible to create smaller structures as well as integrating different features such as cable channels into the body.

In one embodiment each body 110a, 110b is made in one integrated piece. Hence, the body 110a, 110b is preferably a monolithic structure. This increases the durability and decreases the manufacturing costs. In a preferred embodiment the two bodies 110a, 110b are symmetrical to one another.

If the light head 100 comprises two or more bodies 110a, 110b, it is preferred if the shape and material of the bodies are the same or at least very similar.

The at least one body 110a, 110b has a longitudinal passage 116 extending from the proximal end cap 104 to the centre of the body 110a, 110b. The longitudinal passage 116 is configured to receive pressurized air from the air inlet 180. The dimension of the longitudinal passage 116 shall be such that sufficient amount of pressurized air can reach the centre of the body 110a, 110b. The amount of pressurized air needed depends on several factors, for example the dimension of the pipe.

In one embodiment, the longitudinal passage 116 is ended at its one end by the end cap 104. In an alternative embodiment, the longitudinal passage 116 is a non through passage. Hence, the longitudinal passage 116 is ended by a surface of the body 110a, 110b.

The at least one body 110a, 110b has at least one lateral outer side, as will soon be described more in detail. At least one lateral outer side of the body 110a, 110b has at least one outlet 122. A lateral channel 120 extends laterally from the longitudinal passage 116 to the outlet.

One lateral outer side may be arranged with a plurality of lateral channels outlets 122, or a single lateral channel outlet 122. Moreover, the lateral channel outlets 122 may be provided at several outer sides, or on one single outer lateral side.

The dimension of the outlet shall be such that sufficient amount of pressurized air can reach the LED-plate. The amount of pressurized air needed depends on several factors, for example the dimension of the pipe. The diameter of the outlet is preferably around 1 mm. However, other diameters are also possible, both bigger and smaller.

The outlet of the lateral channel 120 is preferably arranged in the center of the outer lateral side of the body 110a, 110b. As will be described more in detail later on, it is preferred if a LED-plate 140 is arranged over, or above, the outlet of the lateral channel 120. In this way, the air will hit the LED-plate and provide cooling.

The body 110a, 110b may further be arranged with a plurality of cable channels 148. These are provided to decrease the distance of cables needed. The cable channels 148 may be arranged in pair. One pair of cable channels 148 may be arranged to connect to one LED-plate 140.

The at least one body 110a, 110b supports a plurality of light emitting diodes (LEDs) arranged on one or more LED-plates 140. The LED-plate 140 has a first surface and a second surface, and the at least one light emitting diode is arranged on the first surface. These LED-plates 140 are preferably connected to the peripheral surface of the body 110a, 110b, in a way such that the second surface of the LED-plate 140 faces the body 110a, 110b. In this way, the LEDs are able to emit light radially out to the pipe during use of the light head 100.

The specification of the LED may vary depending on the circumstances of the use of the light head. The LEDs are typically 100 W but may range up to 200 W, or more. The LEDs may emit light of any suitable wavelength depending on the resin that is to be cured in the liner. For example, suitable wavelengths may be between 395-400 nm or 450-455 nm. In a preferred embodiment the diodes are UV-diodes.

Figure 4A:
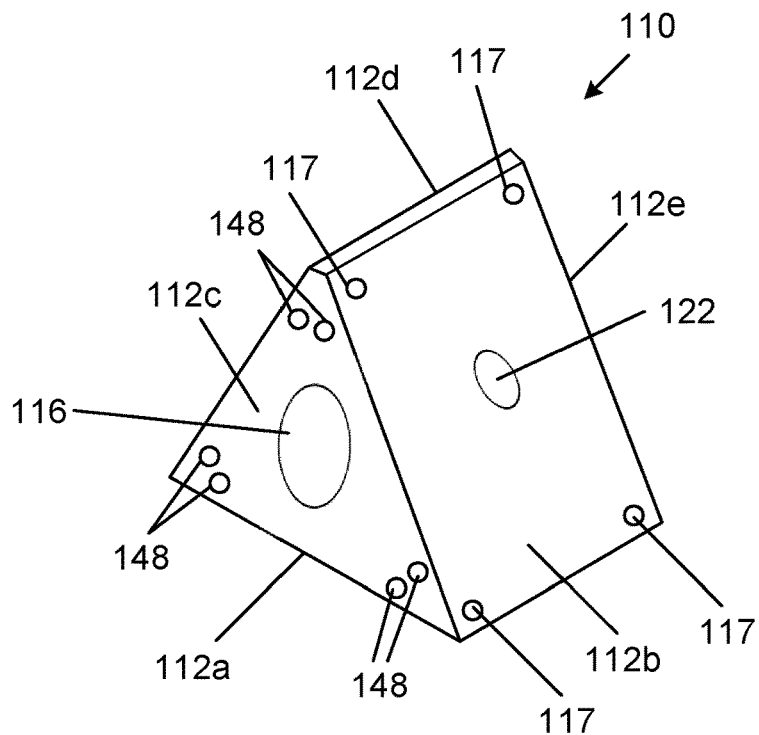
FIG. 4A is a detailed view of a body of a light head according to one embodiment.
Figure 4B:
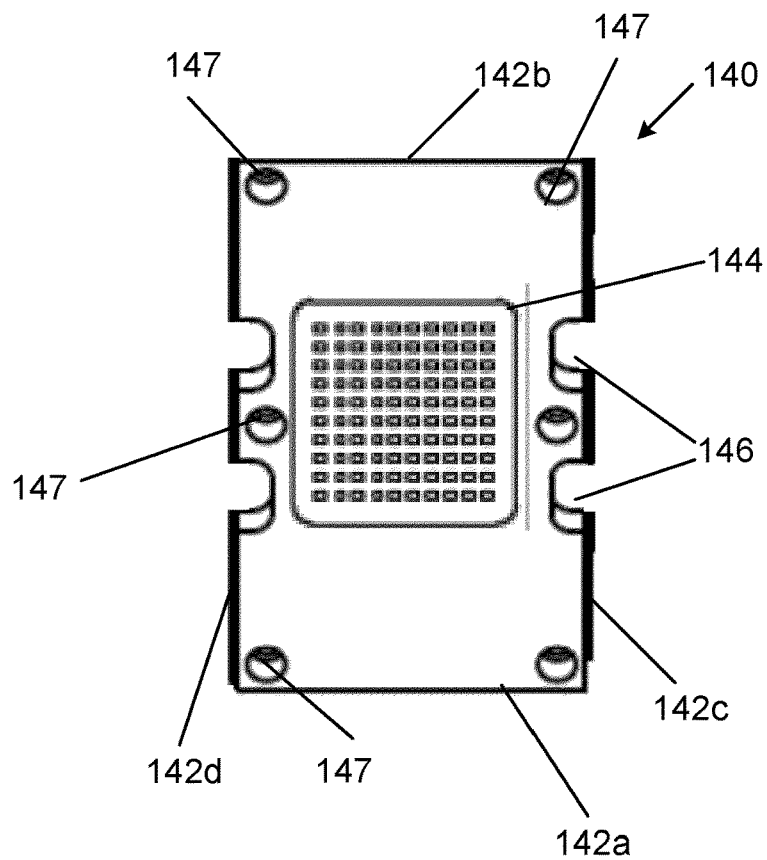
FIG. 4B is a detailed view of a LED-plate of a light head according to one embodiment.
Figure 4C:
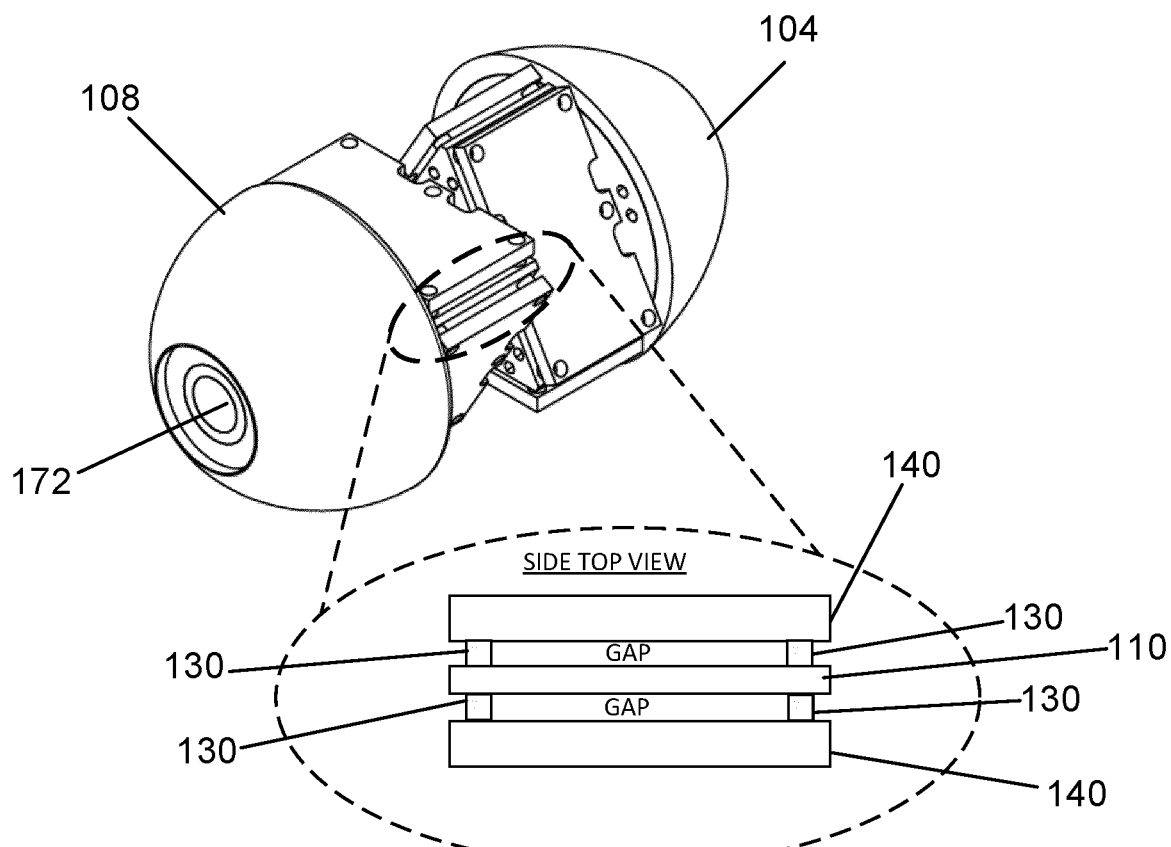
FIG. 4C is an isometric view of a light head according to one embodiment.
Figure 4D:
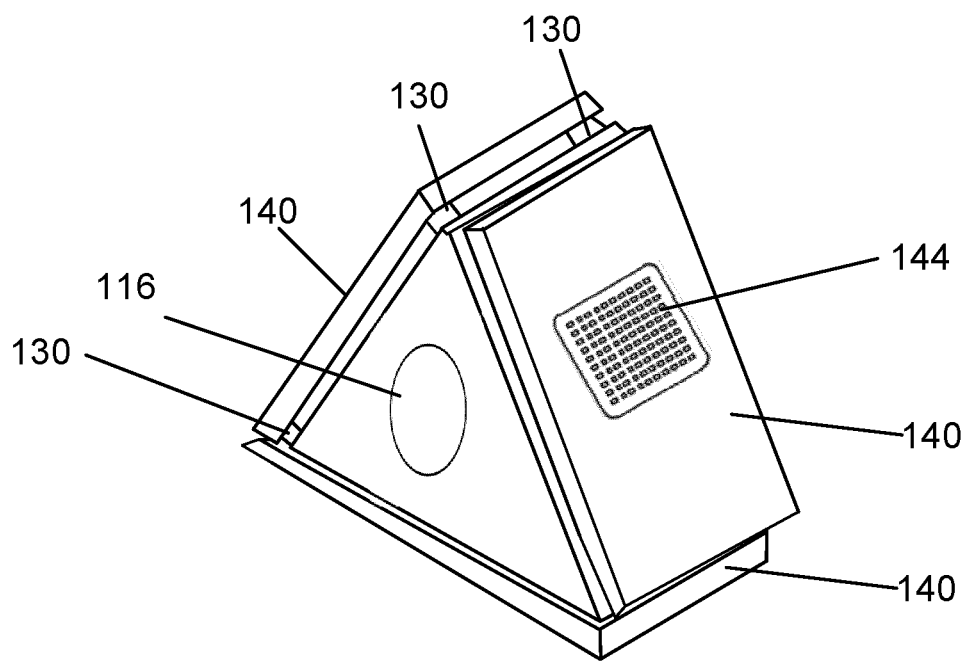
FIG. 4D is an isometric view of a light head according to one embodiment.

The LED-plate 140 may comprise an array of diodes, as illustrated in FIG. 4B. In some embodiments, the LED-plate 140 may additionally comprise one or more cooling elements. If cooling elements are present, these are arranged on the second surface of the plate 140.

FIG. 4A illustrates a LED-plate 140 having a bottom edge 142a, a top edge 142b and two side edges 142c, 142d. The LED-plate 140 may further comprise a plurality of mounting holes 147 that corresponds to the securing holes 117 of the bodies 110a, 110b. This allows for easy mounting and dismounting of the LED-plate 140 to the body 110a, 110b.

Optionally, the two side edges 142c, 142d may be arranged with a plurality of recesses 146. In the embodiment shown in FIG. 4A, each side 142c, 142d are arranged with two recesses 146. Preferably, these recesses are arranged close to the center horizontal line of the plate 140. The recesses may be used to receive cable bearers for a cable.

Screws (not shown) may be used to fasten the LED plates to securing holes 117 on the body 110a, 110b. An example of a suitable screw is an M2.5 machine screw. The screws may also hold the LED power supply (not shown). A damaged LED 140 is easily removed by removing the screws, placing a new LED 140 on the body 110a, 110b, and then re-fastening the screws into the holes 117.

At least one lateral outer side of the body 110a, 110b is arranged with at least one spacer 130 in order to provide a distance between the body 110a, 110b and the LED-plate 140. The spacer 130 thus creates a gap between the body and the LED-plate, providing a space for the air to flow. The height of the spacer is such that it creates an air space sufficient to cool the structure. For example, the height of the spacer 130 may be around 0.7-1.1 mm, and more preferably around 0.8-1 mm.

In a preferred embodiment, the at least one lateral outer side of the body 110a, 110b is arranged with four spacers 130 each arranged with a distance from the others. However, depending on the shape of the body, other numbers of spacers may be preferred.

The spacer 130 may be made of a plastic material. Additionally or alternatively, the spacer may be constructed together with the body 110a, 110b as a monolithic structure.

In an alternative embodiment, the spacer 130 forms part of the LED-plate 140. In yet one embodiment, the spacer 130 is a separate unit arranged to connect the LED-plate 140 with the body 110a, 110b. In one embodiment, the spacer 130 connects the LED-plate 140 and the rectangular side of the body 110a, 110b using the securing holes 117 and the mounting holes 147. This may for example be achieved having a screw extending through the length of the spacer 130.

Hence, the novel and inventive concept of having at least one spacer and at least one lateral channel provides the effect that the longitudinal passage receives air from the air inlet such that in use air from the air inlet passes through the at least one lateral channel of the body such that the air hits the second surface of the LED-plate, and exits through the gap caused by the at least one spacer.

In the embodiment shown in FIGS. 1-4, the shape of the at least one body 110a, 110b is a triangular prism. Moreover, the light head 100 comprises two heads 110a, 110b. The specific embodiment will now be described further.

Each body 110a, 110b has a bottom surface 112a and a plurality of side surfaces 112b-e. The body 110a, 110b comprises two triangular bases and three rectangular sides. Here, the three rectangular sides are the bottom surface 112a, and the two side surfaces 112b, 112d. The triangular sides are the side surface 112c and 112e.

As previously described, the bodies 110a, 110b comprises one longitudinal passage 116 extending along the central axis of the bodies 110a, 110b from the proximal end cap 104 to the distal end cap 108.

As can be seen in FIG. 1-2, LED-plates 140 are arranged at the rectangular sides, 112a, 112b, 112d of the body 110a, 110b. Preferably, one LED-plate 140 is arranged on each rectangular side. Hence, in this embodiment the number of LED-plates 140 are six. Three LED-plates 140 are arranged on each body 110a, 110b. However, as should be understood by a person skilled in the art, other numbers of LED-plates may also be used. The size of the LED-plate 140 may be such that it corresponds to the rectangular sides, 112a, 112b, 112d of the body 110a, 110b. Preferably, the size of the LED-plate 140 is smaller than the rectangular side.

Moreover, each rectangular side 112a, 112b, 112d of the body 110a, 110b is arranged with at least one spacer 130 in order to provide a distance between the body 110a, 110b and the LED-plate 140. In a preferred embodiment, each rectangular side 112a, 112b, 112d of the body 110a, 110b is arranged with four spacers 130, one arranged in each corner.

Each rectangular side 112a, 112b, 112d of the body 110a, 110b is also arranged with an outlet of at least one lateral channel 120. In the embodiment shown in FIGS. 1-3, each rectangular side has one outlet of the lateral channel 120. The outlet is preferably arranged in the center of the rectangular side. The LED-plates 140 of each side is arranged so that is above the outlet 122 of the lateral channel 120. In this way, the air from the air inlet 180 will hit the second surface of the LED-plate 140 and thus provide cooling.

The triangular sides 112c, 112e are preferably arranged with a plurality of cable channels 148. In the embodiment shown in FIG. 4A, six cable channels 148 are provided at each triangular side 112c, 112e. The cable channels 148 may be arranged in pair. Preferably, one pair of cable channels 148 are arranged at each tip of the triangular side 112c, 112e.

Hence, due to the three dimensional symmetry of the body 110a, 110b, in one embodiment there are three LED-plates 160, three outlets 122 of the lateral channels 120, and twelve spacers 140 per body 110a, 110b. However, as should be understood by a person skilled in the art each body could also, for example, comprise three LED-plates 160, six outlets of the lateral channels 120, and twelve spacers 140.

Figure 5:
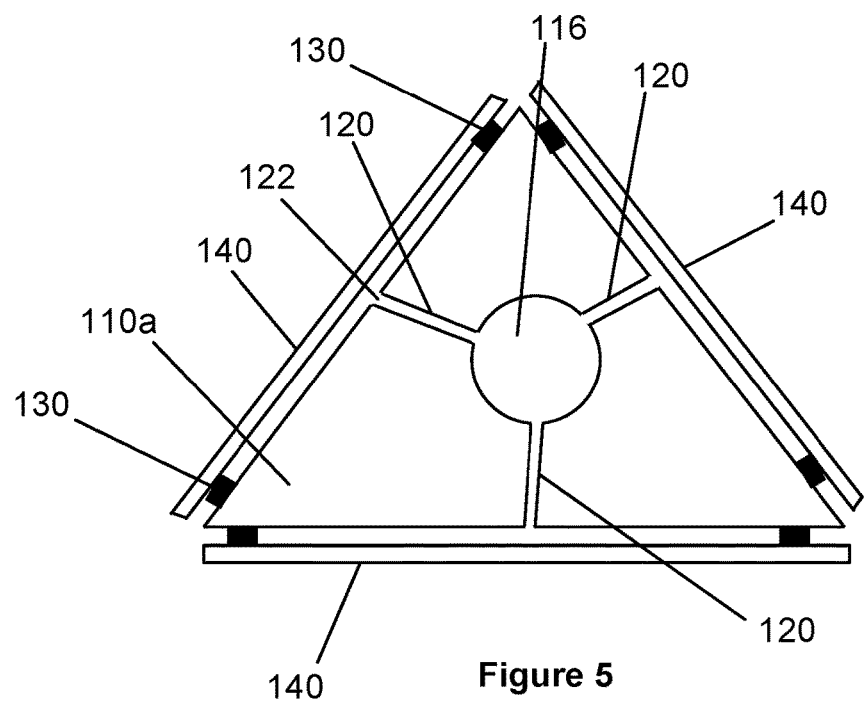
FIG. 5 is a schematic view of a part of a light head according to one embodiment

FIG. 5 shows a cross-sectional view of a light head 100. The longitudinal passage 116 is connected to the at least one lateral channels 120. The lateral channel 120 is extending laterally from the longitudinal passage 116 to the outlet 122 on a lateral outer side of the body. In this embodiment, three channels 120 are extending out from the longitudinal passage to three outlets, each arranged on different lateral outer sides of the body.

Figure 6A:
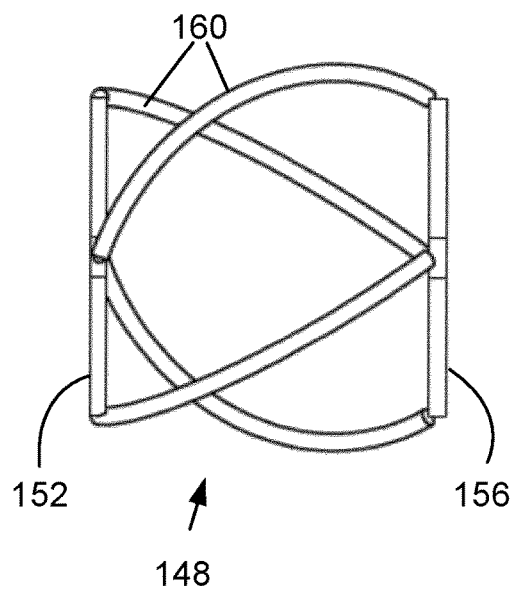
FIG. 6A is a side view of a part of a light head according to one embodiment.
Figure 6B:
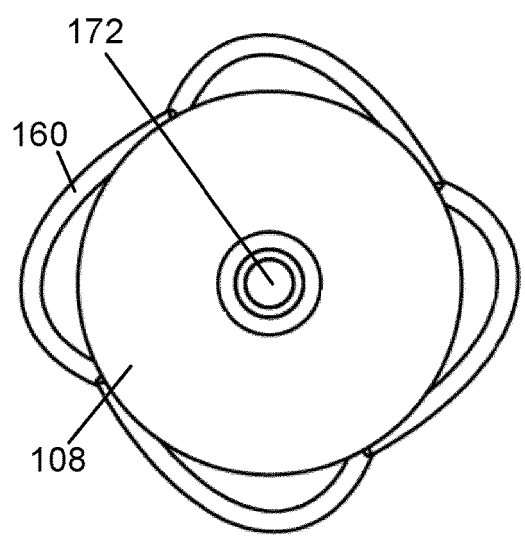
FIG. 6B is a side view of a part of a light head according to one embodiment.

FIGS. 6A-B shows an additional component of the light head 100 in the form of a cage 148. In some embodiments, a cage 148 surrounds the bodies 110a, 110b and reduces the impact of shadows on the curing process that occurs when light from the LED shines on the liner. The cage may have a distal circular member 152, a proximal circular member 156, and four curved connecting arms 160 between the distal circular member 152 and the proximal circular member 156. However, it should be noted that the cage 148 may have any suitable number of connecting arms 160, for example between two and seven connecting arms. Moreover, it should be noted that although the connecting arms 160 in FIGS. 6A-B are curved, the connecting arms need not be curved. During use, the connecting arms 160 touch the liner and thus keeps the bodies 110a, 110b and its LEDs in the center of the pipe.

In some embodiments, a sensor hole (not shown) is provided in distal end cap 108 for a pressure and/or temperature sensor (not shown) to be arranged. During certain applications, it may be desirable to measure the pressure in the liner or the temperature of the liner. Moreover, the distal cap 108 may also be arranged with a printed circuit board (PCB) chip (not shown) that may contain a voltage regulator, LEDs for the camera light to see distally into the pipe, and a chip for measuring the liner temperature with infrared and/or the pressure in the liner in conjunction with the sensor, if present.

The invention claimed is:

1. A light head for use in relining a pipe comprising:
a proximal end cap with a fluid inlet;
a distal end cap;
at least one body arranged between the proximal end cap and the distal end cap, wherein the body has a longitudinal passage extending from the proximal end cap to a center of the body, and wherein at least one lateral channel extends laterally from the longitudinal passage to an outlet on a lateral outer side of the body;
at least one LED-plate having a first surface and a second surface, wherein the first surface comprises at least one light emitting diode (LED) in order to emit light from a light head towards a pipe, and wherein the LED-plate is arranged on the lateral outer side of the body over the outlet;
at least one spacer between the LED-plate and the body in order to create a gap between the plate and the body, and
wherein the longitudinal passage is configured to receive fluid from the inlet such that in use fluid from the inlet passes through the at least one lateral channel of the body such that the fluid hits the second surface of the LED-plate, and exits through the gap caused by the at least one spacer.

2. The light head according claim 1, wherein the at least one body is made of plastic.

3. The light head according to claim 1, wherein the at least one body is a monolithic structure.

4. The light head according to claim 3, wherein the at least one spacer is part of the monolithic structure.

5. The light head according to claim 1, comprising at least two bodies arranged between the proximal end cap and the distal end cap.

6. The light head according to claim 5, wherein the bodies have at least one body securing hole extending between the proximal end cap and the distal end cap configured for receiving a longitudinal screw.

7. The light head according to claim 1, wherein the outlet of the lateral channel is arranged centrally below the LED-plate.

8. The light head according to claim 1, wherein the at least one body is a triangular prism.

9. The light head according to claim 1, comprising three LED-plates, and wherein each body has three lateral channels, each arranged on one lateral outer side of the body and wherein each LED-plate is arranged on the lateral outer sides of the body over the outlets of the lateral channels.

10. The light head according to claim 1, wherein the spacer includes a height in a range of approximately 0.7-1.1 mm.

11. The light head according to claim 1, further comprising a cage surrounding the at least one body, the cage having a distal circular member, a proximal circular member, and at least one connecting arm between the distal circular member and the proximal circular member.

12. The light head according to claim 1, further comprising a hose connected to the fluid inlet for supplying pressurized fluid to the longitudinal passage.

13. The light head according to claim 12, further comprising a hose connected to the fluid inlet for supplying pressurized fluid to the longitudinal passage.

14. A light head system, comprising:
a light head according to claim 1; and
a hose connected to the fluid inlet for supplying pressurized fluid to the longitudinal passage.

* * * * *